United States Patent [19]
Kajiyama

[11] Patent Number: 5,093,669
[45] Date of Patent: Mar. 3, 1992

[54] VEHICLE NAVIGATION APPARATUS

[75] Inventor: Hiroshi Kajiyama, Hiroshima, Japan

[73] Assignee: Mazda Motor Corporation, Hiroshima, Japan

[21] Appl. No.: 599,661

[22] Filed: Oct. 18, 1990

[30] Foreign Application Priority Data

Oct. 20, 1989 [JP] Japan ................... 1-273989
Oct. 12, 1990 [JP] Japan ................... 2-272455

[51] Int. Cl.⁵ ............................................. G01S 3/02
[52] U.S. Cl. .................... 342/457; 364/449; 340/995
[58] Field of Search ............. 342/357, 457; 364/449; 340/990, 995

[56] References Cited

U.S. PATENT DOCUMENTS 4,763,270  8/1988  Itoh et al. ................ 364/449
4,896,154  1/1990  Factor et al. ............. 340/995

Primary Examiner—Theodore M. Blum
Attorney, Agent, or Firm—Price, Heneveld, Cooper, DeWitt & Litton

[57] ABSTRACT

A navigation apparatus arranged in such a manner that the background image and a marker image denoting the user's vehicle position are moved in the opposite directions to each other when the vehicle speed is raised. As a result of the relative movement, the coincidence between the marker and the map image is realized. Since the background image and the marker image are moved in the opposite directions to each other, the scroll speed of the background image can be moderated.

11 Claims, 13 Drawing Sheets

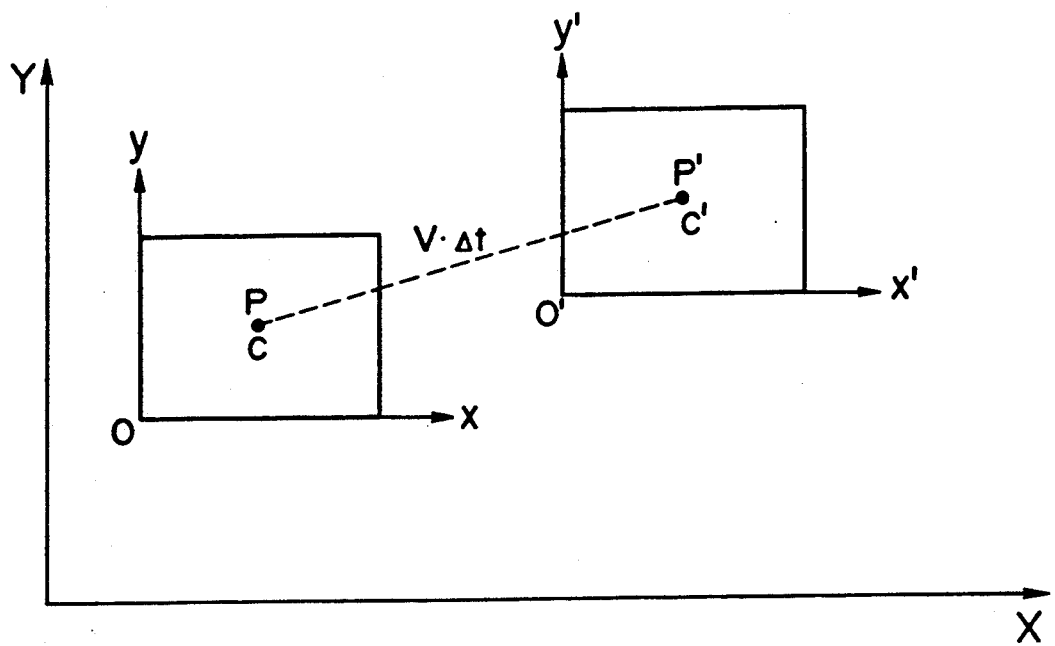
F I G. 1
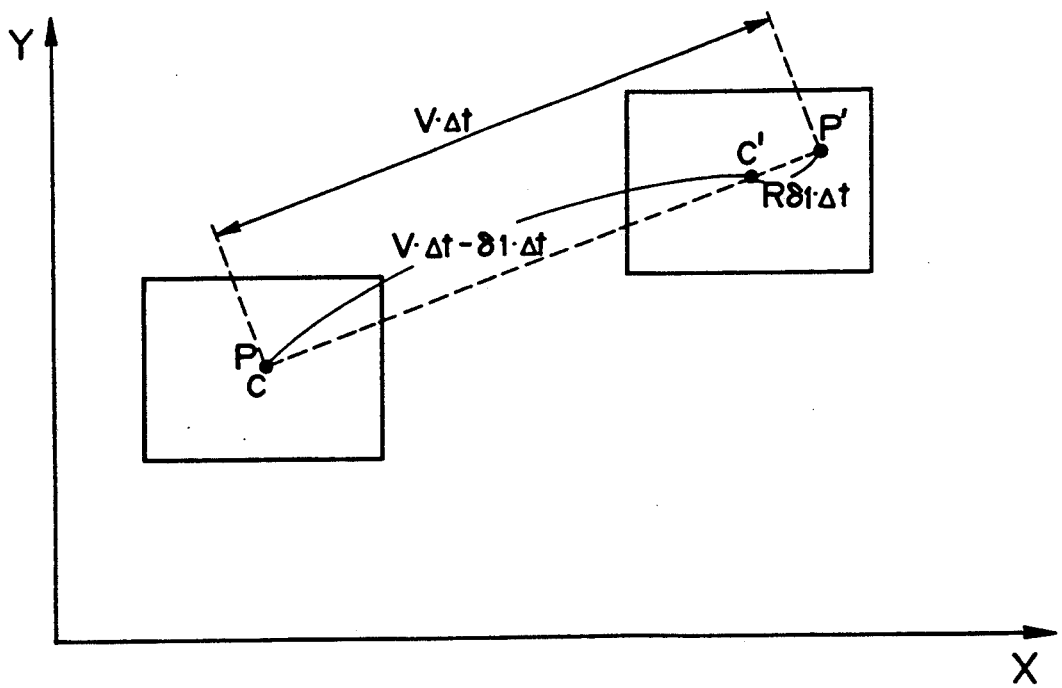
F I G. 4

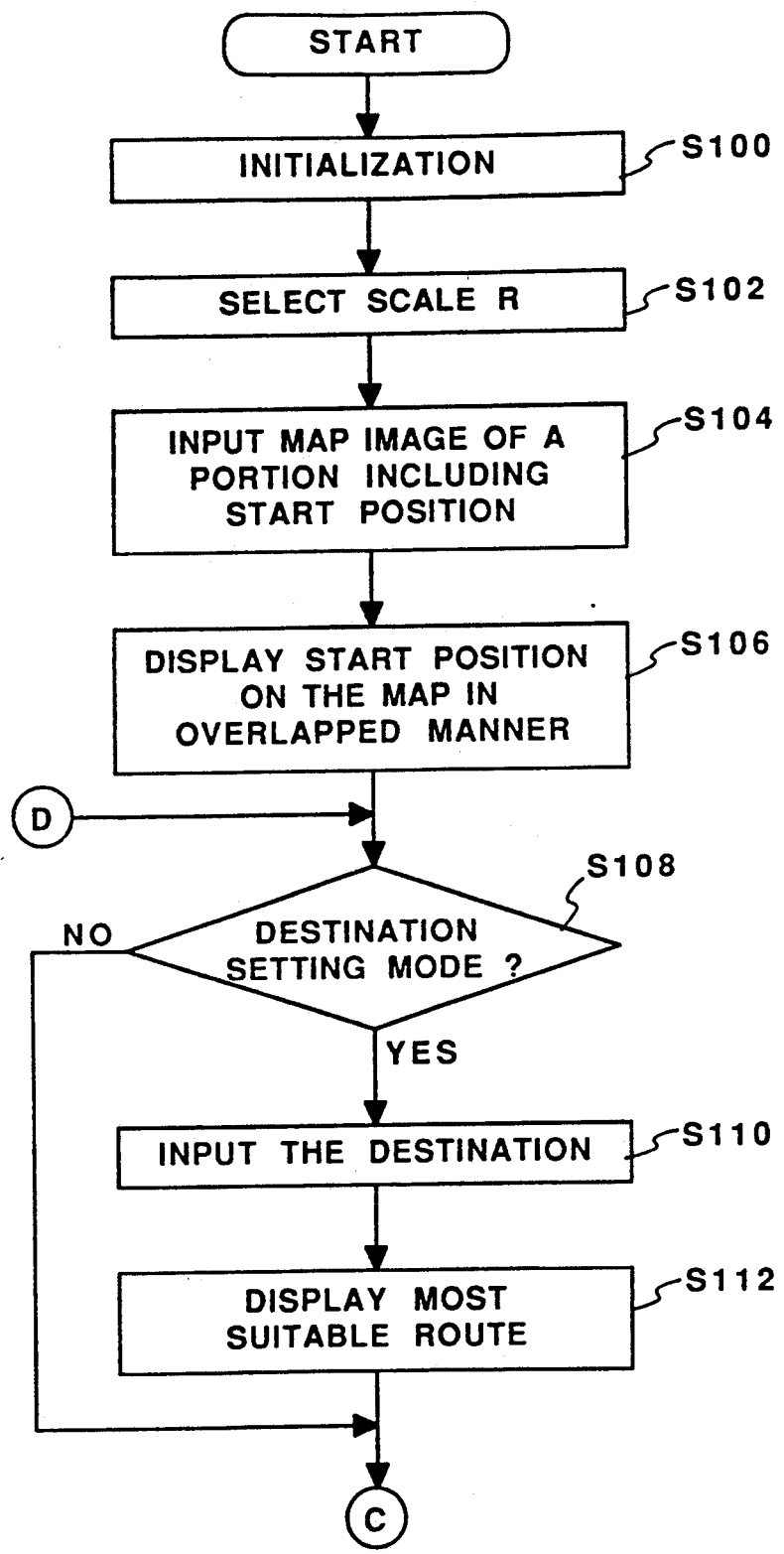
F I G. 15A

VEHICLE NAVIGATION APPARATUS

BACKGROUND OF THE INVENTION

The present invention relates to a drive navigation apparatus for a vehicle, and, more particularly, to an improvement in display method of a navigation apparatus which is provided with a display device.

When a vehicle is driven to a destination, the driver of the vehicle operates the accelerator pedal and the like in the interior of the vehicle which is isolated from the outside, depending upon only a map, signposts and scenery. That is, although an excessive quantity of information is nowadays supplied due to the advancement of computer and data communication technology, the lacking of information necessary for the driver to navigate the vehicle has not been improved from the time when the automobile was invented.

Accordingly, a driving support system so-called a navigation system has, at long last, been developed recently.

The navigation system is classified into a system (to be called an "earth magnetism system" hereinafter) in which the horizontal component of the earth magnetism vector is detected so as to be used as the azimuth parameter and a system (to be called an "inertia navigation system" hereinafter) which employs a gas rate gyro which utilizes the inertia of helium gas as an azimuth sensor so as to detect the azimuth. Furthermore, a novel navigation system, that is, a GPS (Global Positioning System) has attracted attention recently in which three or more orbit satellites (also called "navigation satellites") are used so that an accurate position on the earth can be determined. The above-described systems are classified depending upon the methods of detecting and enabling a user to recognize the position of the vehicle while driving the vehicle. Therefore, the above-described systems basically have common portions.

The navigation system comprises a CD-ROM reproducing device which stores a plurality of color map data items as drive navigation information for a vehicle. Furthermore, the navigation system comprises means for inputting the destination, means for locating the destination thus set in the map data, and a sensor of the above-described earth magnetism type as the means for recognizing the vehicle position. As a result, the most suitable route to the destination between the current position of the vehicle and the destination is displayed on a CRT display (see, for example, Japanese Patent Laid-Open No. 61-20921).

Thanks to the vehicle navigation apparatus thus constituted, the driver can easily reach the destination by operating the vehicle while tracing the most suitable route (road) shown on the map displayed on the CRT display.

A mark showing the position of the user's vehicle is displayed on the route shown in the frame of the display, the mark being shown in a plot manner and arranged to be moved in synchronization with the movement of the vehicle.

The navigation system is provided with a display device for displaying the mark of the current position of the vehicle together with map image. The mark and the map image have been conventionally displayed in the following methods:

I. The background map image is moved in accordance with the movement of the vehicle while fixing the vehicle position mark at a predetermined position in the display frame.

II. The vehicle position mark is moved in accordance with the movement of the vehicle while fixing the background map image.

According to either of the above-described methods, the positional relationship between the vehicle position and the map image is changed in accordance with the movement of the vehicle.

Since a driver tends to feel that the outside is changed with respect to the vehicle as an alternative to the feeling that the vehicle is moved with respect to the outside, an evaluation has been made that the above-described method I in which the background map image is changed can be easily used by a driver.

However, in the above-described system I in which the background image is moved in accordance with the movement of the vehicle, the movement of the map becomes too fast when the vehicle speed has been raised, causing a problem to arise in that the driver cannot easily recognize the position of the vehicle. In particular, the map image is displayed in the smaller reduction rate, the more the visibility deteriorates since the map movement speed becomes higher in inverse proportion to the reduction ratio of the map. That is, the scroll speed of the display has a certain limit to allow for the driver to recognize the map image. Therefore, it cannot be raised over a certain speed. If the scroll speed is raised neglecting the visibility, the scroll speed encounters a physical limit due to the limit of the processing speed of the image processing computer.

As described above, the scroll speed has limits so as to make the display easily recognizable and due to the image processing speed of the computer.

As a result, if the vehicle speed is too high, the scroll speed which corresponds to the vehicle speed sometimes exceeds the above-described speed limits. It leads to a fact that vehicle position runs out of the display frame, causing a problem to arise in that the navigation apparatus cannot be used.

SUMMARY OF THE INVENTION

Accordingly, an object of the present invention is to provide a drive navigation apparatus in which the speed at which the background image scrolls cannot be raised excessively and the displayed vehicle position does not run out of the display range even if the vehicle runs at high speed.

In order to achieve the above-described object, an aspect of the invention lies in a drive navigation apparatus for detecting the current vehicle position, overlapping a marker image P denoting the vehicle position thus detected on a background map image and displaying them on a display frame having a predetermined display size therein so that a driver is guided at the time of the operation of the vehicle, said apparatus comprising:

display means having said display frame;

speed detection means for detecting the vehicle speed V of the vehicle; and display control means for fixedly displaying either said marker image P or said background map image when the vehicle speed V is lower than predetermined vehicle speed V1 while displaying the other image in a scrolled manner which corresponds to the movement of the vehicle and displaying both said marker image P and said background map image in such a manner that they are scrolled in opposite directions to each other in accordance with the movement of the vehicle when the vehicle speed V thus detected is faster than said predetermined vehicle speed V1.

According to the present invention, both the marker image P and the background map image are scrolled in accordance with the movement of the vehicle. Therefore, the correct positional relationship between the vehicle position and the map can be maintained. Furthermore, since both the marker image P and the background map image are scrolled in the opposite directions to each other, the relative difference in the scroll speeds can be reduced. Therefore, an excellent visibility can be maintained.

According to a preferred aspect of the present invention, the above-described relative scroll control is performed in accordance with the determination made about the vehicle speed V and the reduction ratio R of the displayed map.

According to a preferred aspect of the present invention, the above-described relative scroll control is performed in accordance with the determination made about the vehicle speed V and the reduction ratio R of the displayed map and the background map image is scrolled at a predetermined scroll speed Smax and the vehicle marker is scrolled at speeds which are continuously changed in accordance with the vehicle speed V.

According to a preferred aspect of the present invention, the above-described relative scroll control is performed in accordance with the determination made about the vehicle speed V and the reduction ratio R of the displayed map, the vehicle marker is jumped at a predetermined jump speed $\delta 0$ in the direction of the movement of the vehicle and the above-described background image is scrolled at speed $S = V/R - \delta 0$ in the opposite direction to the direction of the movement of the vehicle.

According to a preferred aspect of the present invention, a variety of the above-described jump speed $\delta 0$ are provided so as to correspond to the vehicle speed.

According to a preferred aspect of the present invention, the value of the above-described jump speed $\delta 0$ is restricted in a range in which the vehicle marker does not run out of the display frame of the display apparatus due to the jump at the speed $\delta 0$.

According to a preferred aspect of the present invention, in the case where the reduction ratio of said map image is small or in the case where the vehicle speed is high, said scroll speed of said map image is set to the maximum value.

According to a preferred aspect of the present invention, when said vehicle marker has approached the end portion of said display frame of said display means, said scroll speed of said map image is set to the maximum value.

According to a preferred aspect of the present invention, said map image is replaced by an image of a small reduction ratio when the vehicle has approached the destination.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIGS. 1 to 7 illustrate the principle of the operation of the first embodiment of the present invention;

FIGS. 15a and 15b show flow charts which illustrate the control operation performed in according with the second embodiment.

PREFERRED EMBODIMENT OF THE PRESENT INVENTION

Figure 2:
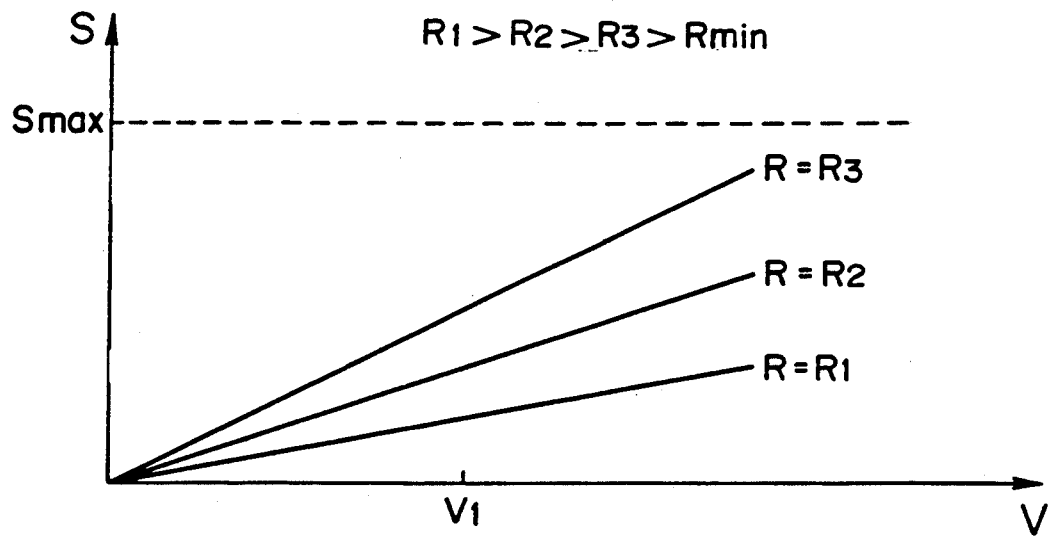

Preferred embodiments (first and second) of a drive navigation apparatus according to the present invention will be described with reference to the drawings. According to the first embodiment, a navigation apparatus will now be described in which the display is performed in such a manner that the vehicle position is displayed at the central position of the frame and the background map image is scrolled in accordance with the movement of the vehicle.

First, the principle of the first embodiment will now be described prior to the description of the specific example of the structure.

Principle of the Operation of First Embodiment

The principle of the operation of the apparatus according to the first embodiment will be described with reference to FIGS. 1 to 3.

In the navigation apparatus according to this embodiment, the following display control operation is performed:

(1): In the case where the reduction ratio of a selected map is large, the vehicle position is always displayed at (for example) the central position while the background map is scrolled. In the above-described case in which the reduction ratio of the map is large, a relatively large region is displayed in the display frame. Therefore, the image scroll speed can be reduced even if the vehicle is driven at a high speed. Therefore, the deterioration in the visibility does not arise and the display position of the vehicle does not run out of the display frame.

(2): In the case where the vehicle speed is lower than 50 km/h even if the reduction ratio of the selected map is low, the vehicle position is always displayed at the central position of the display frame and the background map is scrolled because of the same reason as that described in (1).

(3): In the case where the vehicle speed exceeds 50 km/h, the visibility of the map may be deteriorated or the vehicle display position may run out of the display frame. Therefore, the position of the display marker of the vehicle is jumped by a predetermined distance ($=\vec{\delta}\cdot\Delta t$) in the opposite direction to the direction of the scroll of the map image. As a result of the above-described jumping, the quantity of the scroll of the background map image is reduced. Therefore, the deterioration in the visibility can be prevented and the run out of the display position of the vehicle can be prevented.

Specifically, the jumping operation is performed as follows:

(3)-1: In the case where the vehicle speed V is 50 km/h $\leq$ V $<$ 80 km/h, the position of the display marker of the vehicle is jumped by $\vec{\delta}10\cdot\Delta t$ in the opposite direction to the direction of the scroll of the image.

(3)-2: In the case where the speed is 80 km/h $\leq$ V $<$ 120 km/h, the position of the display marker of the vehicle is jumped by $\vec{\delta}20\cdot\Delta t$.

(3)-3: In the case where the speed is 120 km/h $\leq$ V $<$ 140 km/h, the position of the display marker of the vehicle is jumped by $\vec{\delta}30\cdot\Delta t$.

(3)-4: In the case where the speed V $\geq$ 140 km/h, the background image is scrolled at the maximum scroll speed and the vehicle position is displayed in a free manner.

FIG. 1 illustrates the operation performed in the cases (1) and (2l). Referring to FIG. 1, coordinate system XY expresses the space of a map image. Two coordinate systems xy defined by Oxy and O'x'y' express the spaces displayed by the display device. The display space Oxy expresses the display region displayed by the display device at time t, while the display space O'x'y' expresses the display region displayed by the display device at time t+$\Delta t$, where time lapse $\Delta t$ is the time taken from a displayed image to be changed to the next displayed image. That is, during the time interval $\Delta t$, the recognition of the vehicle position and the necessary image processing are performed. Referring to the drawing, symbol P represents the position of the vehicle marker at time t, while symbol P' represents the position of the same at time t+$\Delta t$. In the case where the vehicle speed V is 50 km/h or lower, or the map reduction ratio R is large, the scroll of the background map image can catch up with the vehicle movement and then P' is, similarly to P, displayed at the central position of the image frame. Therefore, the following vector equation holds:

$$\vec{P} = \vec{p} + \vec{V}\cdot\Delta t \tag{1}$$

The maximum cruising speed of a vehicle is about 120 km/h. The minimum reduction ratio of the map which has been previously confirmed that no deterioration in the visibility nor the runout of the display vehicle position occur is determined to be Rmin. Furthermore, the maximum scroll speed at which the scrolling can be performed in the display device without the deterioration in the visibility is determined to be Smax (unit=km/h = $10^6$ mm/h). The movement distance $\vec{V}\cdot\Delta t$ of the vehicle on the display frame according to Equation (1) at a certain reduction ratio R becomes as follows:

$$\frac{V\cdot\Delta t}{R} \tag{2}$$

That is, the vehicle position is scrolled at speed V/R at each $\Delta t$. That is, the scroll speed S of the map image at this time becomes as follows:

$$\vec{S} \leq \frac{\vec{V}}{R} \tag{3}$$

The above-described speed S is smaller than Smax at which the deterioration in the visibility commences. That is, assuming that the vehicle speed V1 at which the scrolling cannot follow it can be expressed as follows:

$$V1 = Smax\cdot Rmin \tag{4}$$

The movement distance of the displayed vehicle position on the display frame according to Equation (1) can be expressed as follows:

$$\frac{\vec{V}\cdot\Delta t}{Rmin} \tag{5}$$

That is, the problem taken place in that the visibility is deteriorated and the scrolling cannot follow the vehicle speed can be prevented if the vehicle speed meets the following equation:

$$V \leq Smax\cdot Rmin \tag{6}$$

Since the usual vehicle speed is 50 km/h, the above-described speed V1 is arranged to be 50 km/h according to this embodiment. The map reduction ratio Rmin which is most suitable for performing the navigation at the above-described speed is determined in accordance with the resolution of the displayed image of buildings and roads. Therefore, the processing speed (for example, the clock rate or the number of bits) in the processing computer of the navigation apparatus is so determined as to meet the above-described Equation (6).

Thus, if the vehicle speed V holds the relationship V $\leq$ V1 or the reduction ratio R is larger than Rmin, the scroll is able to correspond to the vehicle speed.

Figure 3:
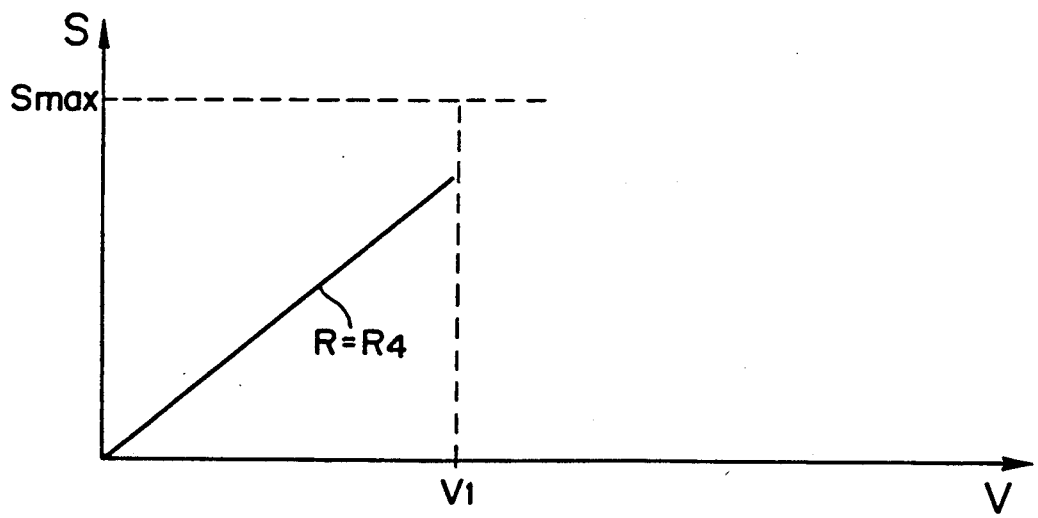

FIG. 2 illustrates a case where, although the scroll speed S is raised in proportional to the vehicle speed V in the case where the reduction ratio R is larger than Rmin, the same does not exceed Smax. FIG. 3 illustrates a case where, when reduction ratio R4 is larger than Rmin, that is, when the map is displayed in a large reduction ratio and the vehicle speed is less than V1, the scroll speed S does not exceed Smax.

Then, a case where the scrolling cannot correspond to the vehicle speed, that is, a case where reduction ratio R is smaller than Rmin, namely, a case where the map is displayed with a small reduction ratio will be described with reference to FIG. 4 and ensuing drawings.

FIG. 4 illustrates a state of the movement of the displayed vehicle, which is moving at speed V1 (=50 km/h) $\leq$ V $<$ 80 km/h, from the central position P in the display frame at time t to P' at time t+$\Delta t$. Expressing in the XY coordinate, P' meets the following relationship:

$$\vec{P'} = \vec{P} + \vec{V}\cdot\Delta t \tag{7}$$

However, since the frame scrolling cannot follow the vehicle speed, the point P' is displaced from center C' of the display frame by a distance of vector $\vec{\delta 1}\cdot \Delta t$, where symbol $\vec{\delta 1}$ the quantity to be called the "moving speed of the vehicle display position". Therefore, the center C' of the display frame at time $t+\Delta t$ can be expressed by the following equation:

$$\vec{C'} = \vec{C} + (\vec{V} - R\cdot\vec{\delta 1})\cdot \Delta t \qquad (8)$$

Therefore, the center C is scrolled on the frame by the following degree when a map of a reduction ratio of R5 ($<$Rmin) is used:

$$\frac{(\vec{V} - R5\cdot\vec{\delta 1})\cdot \Delta t}{R5} \qquad (9)$$

In the case where the scroll cannot follow the vehicle speed, the scroll must be performed at the maximum speed Smax at which the visibility is not deteriorated, therefore, the following equation is held:

$$\vec{Smax}\cdot \Delta t = \frac{(\vec{V} - R5\cdot\vec{\delta 1})\cdot \Delta t}{R5} \qquad (10)$$

Therefore, the following relationship holds:

$$\vec{\delta 1} = \frac{\vec{V}}{R5} - \vec{Smax} \qquad (11)$$

Equation (11) implies that, when reduction ratio R5 is smaller than Rmin and as well the following relationship V$>$Smax·R5 (=V1) holds, the moving speed $\vec{\delta 1}$ becomes a positive value, while its quantity increases in proportion to the vehicle speed V. That is, the map and the vehicle position $\vec{P}$ are made coincide with each other by displaying the vehicle position $\vec{P}$ at a position which is moved ahead by a degree of $\vec{\delta 1}\cdot\Delta t$ from the center C of the display frame.

Figure 5:
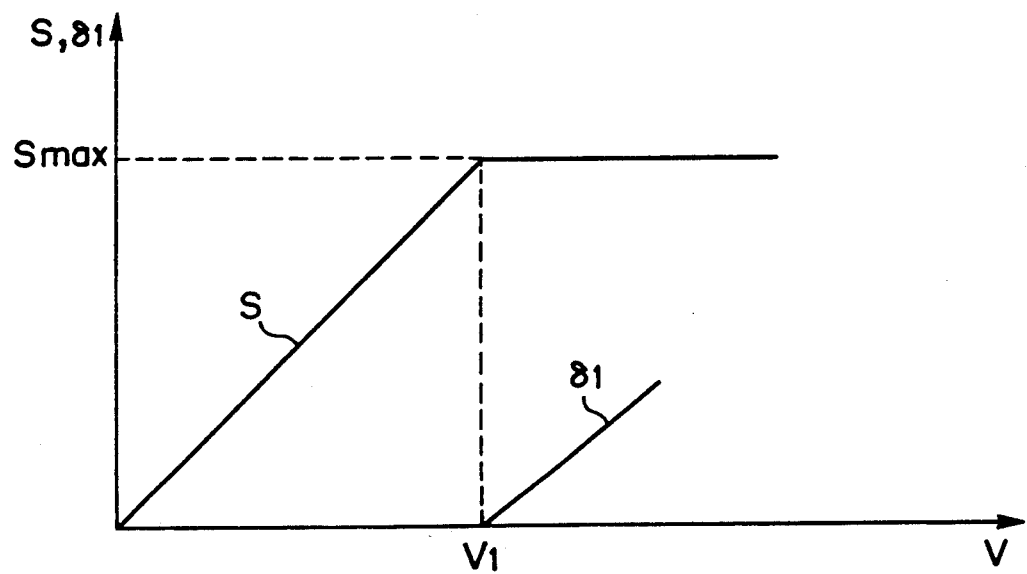

The above-described relationship is shown in FIG. 5. Referring to FIG. 5, when the vehicle speed V exceeds V1, the scroll speed S is maintained at Smax and the moving speed $\vec{\delta 1}$ has been increased by a degree which corresponds to the quantity of the excessiveness of the vehicle speed over V1. That is, referring to FIG. 5, although the vehicle position is correctly displayed on the map due to the continuous change of $\vec{\delta 1}$, the map and the vehicle position are scrolled in the opposite directions to each other. However, the above-described scroll movement sometimes takes too long a time to be completed.

Modification of First Embodiment

Accordingly, a modification of the first embodiment is proposed. It is arranged in such a manner that the vehicle position is, at each time $\Delta t$, displayed while it is displaced by a fixed quantity $\vec{\delta 10}$ from the center C of the display frame in the case where R$<$Rmin and and V$>$V1 (=Smax·Rmin). However, according to this modification, the vehicle position cannot be correctly displayed on the display frame. Therefore, the above-described problem is corrected by controlling the speed at which the background map is scrolled. That is, according to the method shown in FIG. 5, the scroll speed S is fixed in the region V$>$V1. However, the scroll speed S is, according to this modification, continuously changed in the region V$>$V1 in accordance with the vehicle speed. Then, that modification method will be described with reference to FIGS. 6 and 7.

Figure 6:
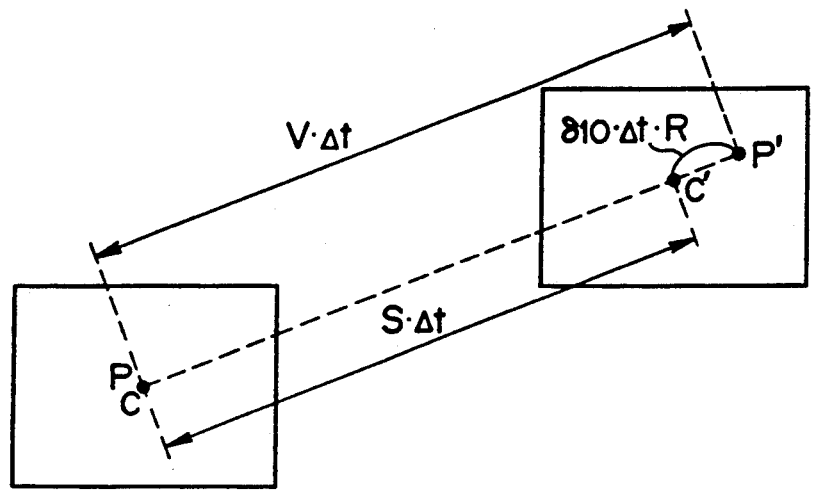

Referring to FIG. 6, it is assumed that the vehicle position at time t has been moved to $\vec{P'}$ at time $t+\Delta t$. According to this method, center $\vec{C'}$ of the display frame at time $t+\Delta t$ is displaced from P' by $\vec{\delta 10}$. Furthermore, assuming that the central point at time t is scrolled at scroll speed S to C' after a lapse of time $\Delta t$, the following equation can be obtained with reference to FIG. 6 similarly to Equation (11):

$$\vec{S} = \frac{\vec{V}}{R5} - \vec{\delta 10} \qquad (12)$$

Figure 7:
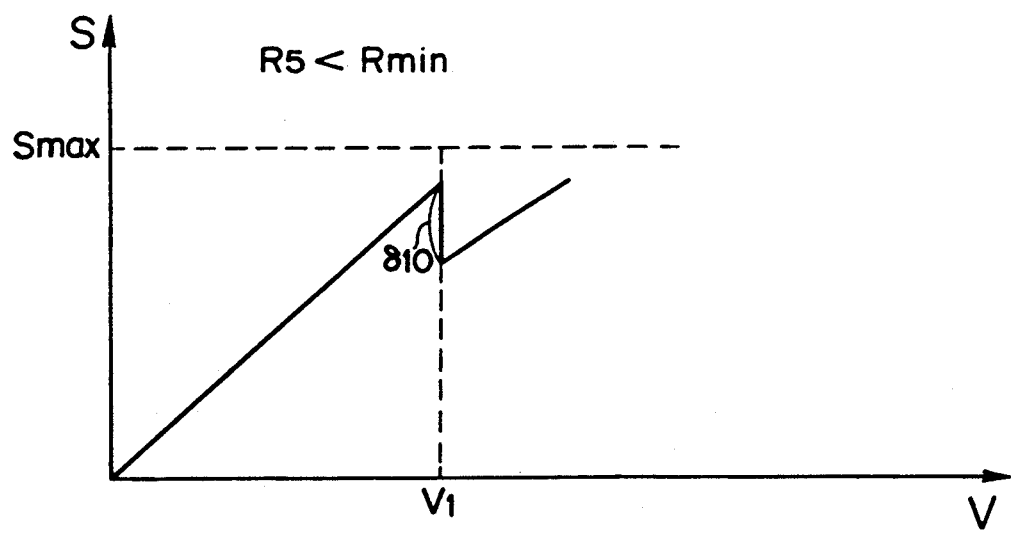

That is, when the vehicle is moved at speed V, the background image is moved at the scroll speed S which meets Equation (10) and as well as the vehicle position is displayed at a position displaced from the center C' of the display frame by a quantity of $\vec{\delta 10}\cdot\Delta t$. FIG. 7 illustrates the change in the scroll speed in the case of the principle shown in FIG. 5. That is, the scroll speed is discontinuously changed when the vehicle sped V exceeds V1, and then the same is increased in accordance with the rise in the vehicle speed V. Therefore, $\delta 10$ according to this method is called the "jump speed" of the display marker.

FIGS. 6 and 7 illustrate the case where the map reduction ratio R is smaller than Rmin and as well as the vehicle speed V holds the following relationship V$\geq$V1 (=50 km/h). In this case, the scroll speed is increased while holding the relationship V$\geq$V1. Therefore, if the vehicle speed is too high, the scroll speed S also becomes raised excessive, causing a problem to be rised in that the visibility deteriorates.

Therefore, in the case where the vehicle speed ranges as follows: 50 km/h$<$V$\leq$80 km/h, the above-described jump speed $\delta 10$ is induced, while jump speed $\delta 30$ is induced in the case where the vehicle speed holds the relationship V$>$120 km/h. The degrees $\delta 20$ and $\delta 30$ are basically and similarly arranged to $\delta 10$ while holding the relationship $\delta 10 <\delta 20<\delta 30$.

Therefore, the map image is scrolled at the following scroll speed in the case where 80 km/h$<$V$\leq$120 km/h:

$$\vec{S} = \frac{\vec{V}}{R5} - \vec{\delta 20} \qquad (13)$$

Furthermore, in the case where 120 km/h$<$V$\leq$140 km/h, the map image is scrolled at the following speed:

$$\vec{S} = \frac{\vec{V}}{R5} - \vec{\delta 30} \qquad (14)$$

However, the jump speed $\delta$ has the following limit. Assuming that the width of the display frame is a and the height of the same is b, the vehicle display position must not run out of the display range as a result of the jump of distance $\delta\cdot\Delta t$. Therefore, the following relationships must be satisfied:

$$|\delta 10X|, |\delta 20X|, |\delta 30X| < \frac{a}{2} \qquad (15)$$

The following relationships must simultaneously be satisfied:

In the case where the vehicle speed V exceeds 140 km/h, the map scrolling cannot correspond to the vehicle speed and the vehicle position runs out of the display frame. Therefore, the vehicle position is not displayed and the map image is scrolled at the maximum scroll speed Smax.

Structure of the Apparatus

The principle of the display control operation according to the present invention is constituted as described above.

The structure and the operation of the apparatus according to the embodiment will now be described in detail with reference to FIG. 8.

Figure 8:
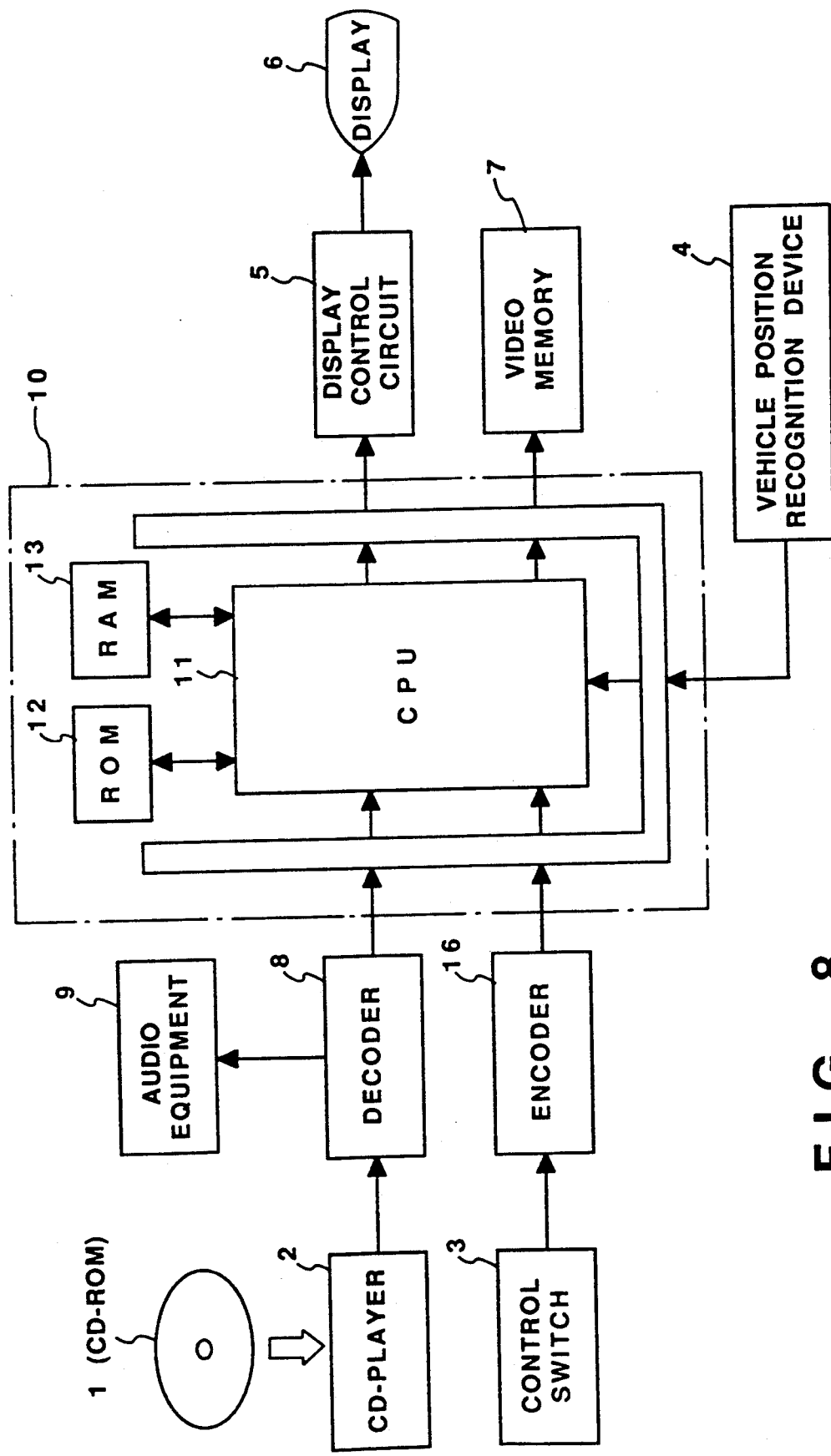
FIG. 8 is a block diagram which illustrates the overall navigation apparatus system according to the present invention.

FIG. 8 illustrates the structure of the vehicle navigation apparatus. Reference numeral 10 represents a navigation control unit serving as the core portion of the apparatus according to this embodiment. The navigation control unit 10 comprises a central processing unit (CPU) 11, a read only memory (abbreviated to "ROM" hereinafter) 12 storing a control program, a random access memory (abbreviated to "RAM" hereinafter) 13 for optionally recording a variety of control data items, and an interface circuit 14 through which data is transmitted/received between a variety of external equipments and CPU 11.

Figure 10:
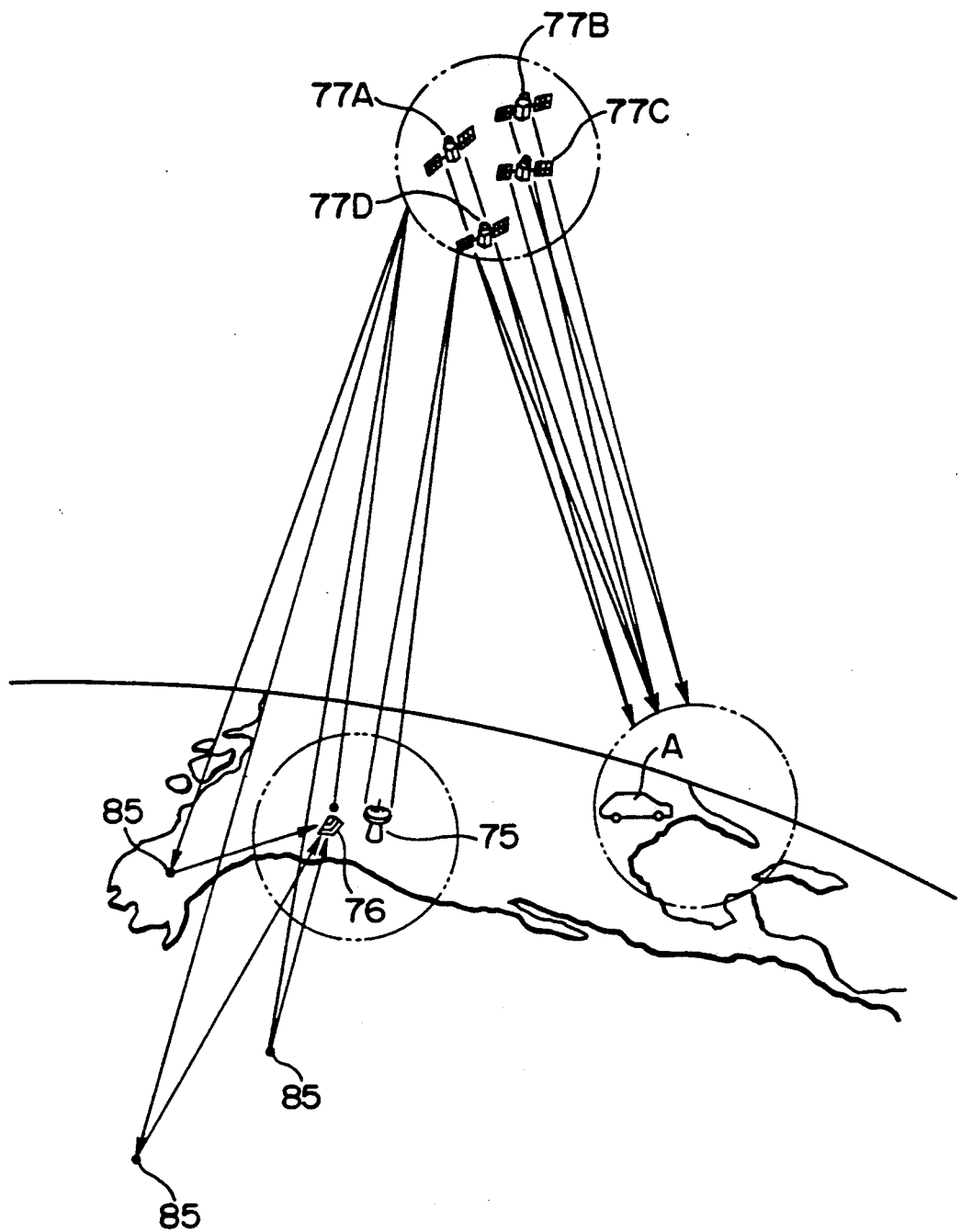
FIG. 10 illustrates a GPS system.

As the above-described external equipments to be combined with the navigation control unit, the following equipments are enumerated: a CD-ROM (Compact Disk type Read Only Memory) 1 which stores a multiplicity of reduction ratios of drive navigation information about a multiplicity of places in the above-described map format, a CD player 2 to be mounted on the vehicle and acting to read map information from the CD-ROM 1, a switch portion 3 with which the destination can be set, changed and reset and the most suitable route is changed, a current position recognition device 4 with which the current position of the user's vehicle can be recognized, a display control circuit 5 which receives an image signal output supplied from the CPU 11 so as to display it on the CRT display 6 disposed in the instrument panel portion and a video memory 7 provided for the above-described display control circuit 5. As shown in FIG. 10, the current position recognition device 4 comprises a GPS receiver for receiving signals (SHF) which have been supplied from three, preferably three or more, navigation satellites (77A, 77D, ..., see FIG. 4) launched on the circular orbit around the earth E.

The CD player 2 operates the above-described CD-ROM 1 so that predetermined information items are selected from map information stored in the CD-ROM 1, the information thus selected being transmitted in accordance with an address instructed (with pointing north, south, east and west). The information is then received by the CPU 11 via a decoder 8 and the interface circuit 14. The information thus read is temporarily stored in the RAM 13. The output from the CD player 2 and decoded by the decoder 8 is also transmitted to an ordinary audio device (an amplifier, an equalizer, a speaker and the like) 9 for vehicles The CD-ROM 1 is capable of storing map information of about 30,000 color still images. According to this embodiment, the map information can be available in the form of a reduction ratio selected from, for example, three or more reduction ratios provided. Furthermore, the map information can be enlarged and reduced in ratios of 8 steps.

The control switch 3 is a touch sensor type comprising switches of "MENU", "INFORMATION", "RESET", "ENLARGEMENT", "REDUCTION" and "MODIFICATION". The output from the control switch 3, which is transmitted in response to the switch-on operation of the control switch 3, is encoded by an encoder 16. The output thus encoded is then supplied to the CPU 11 via the interface circuit 14. The CPU 11 subjects the above-described input supplied in response to the operation of the control switch 3 to a predetermined processing (program processing) and operates the display control circuit 5 for operating the CRT so that an image corresponding to the above-described command is displayed.

Figure 9:
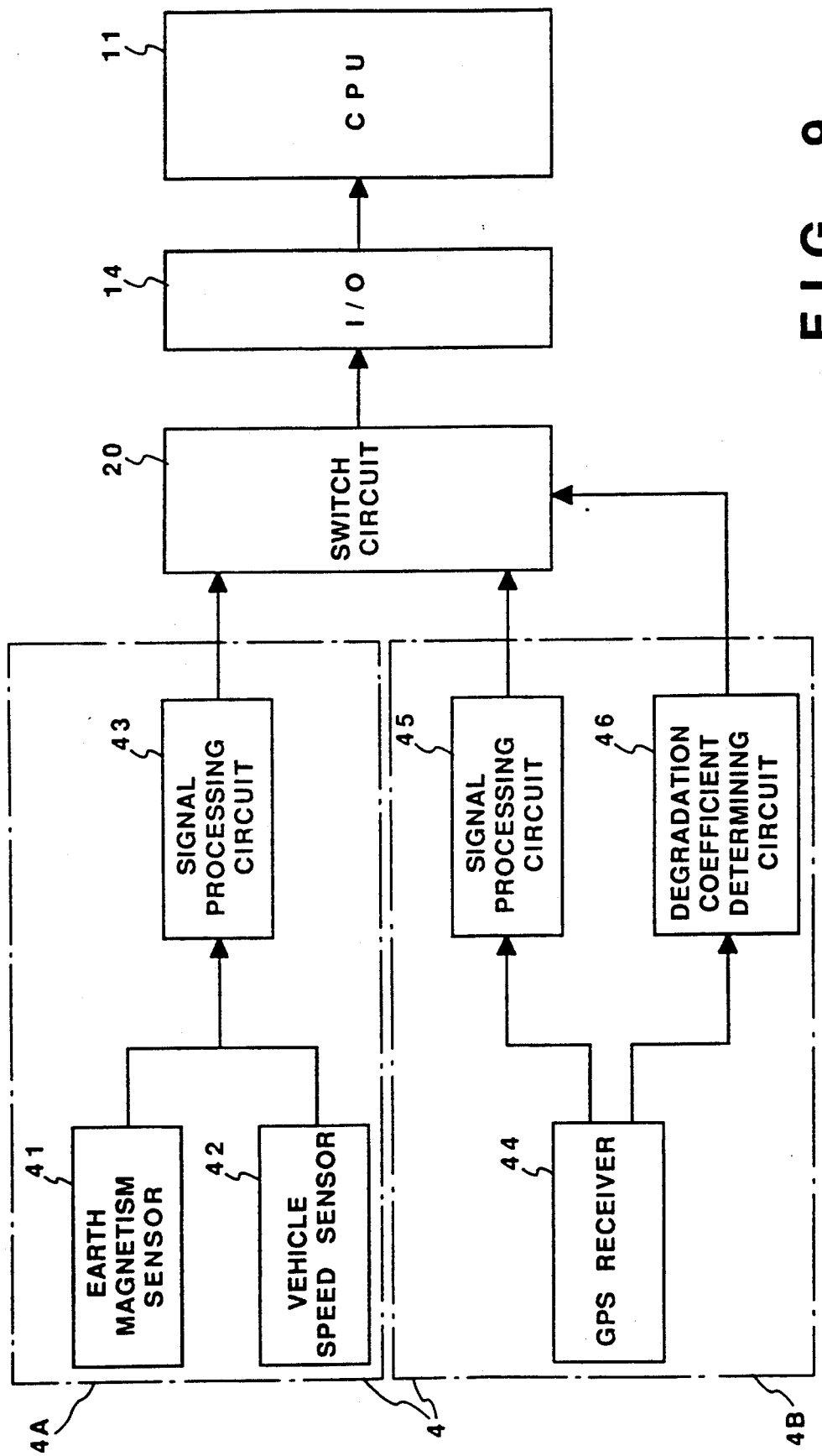
FIG. 9 is a block diagram which illustrates the structure of the vehicle position recognition apparatus for use in the system according to the present invention.

As shown in FIG. 9, the vehicle position recognition device 4 according to this embodiment comprises a first vehicle-position recognition portion 4A for recognizing it in accordance with the earth magnetism and a second vehicle-position recognition portion 4B for recognizing the same in accordance with the GPS. Each of the outputs from the two recognition portions 4A and 4B is, via a switch circuit 20, supplied to the CPU 11.

The first vehicle-position recognition portion 4A comprises, as shown in FIG. 9, a vehicle speed sensor 42 for detecting the vehicle speed, an earth magnetism sensor 41 comprising a magnetic compass and a signal processing portion 43 for recognizing the current position of the user's vehicle by detecting the moving direction of the vehicle and the relative distance from a datum point in response to the detection signal transmitted from the above-described two sensors 41 and 42.

The second vehicle position recognition portion 4B recognizes the vehicle position by utilizing, for example, a world position determining satellite system as shown in FIG. 10. The satellite system of this type comprises, as shown in FIG. 10, a master control station 76 disposed on the ground and causing an earth antenna 75 to transmit an electric wave, four artificial navigation satellites (GPS) 77A to 77D for respectively receiving the electric wave transmitted from the earth antenna 75 and monitor stations 85 for receiving the electric wave transmitted from each of the satellites 77A to 77D and calculating the degradation coefficient denoting the degree of the error in the measurement of the electric wave so as to cause the degradation coefficient overlap the electric wave transmitted from the above-described earth antenna 75. According to the thus constituted system, the second vehicle position recognition portion 4B comprises, as shown in FIG. 9, a GPS receiver 44 for receiving the electric wave transmitted from each of the four satellites 77A to 77D, a signal processing circuit 43 for recognizing each of the distances between the four satellites 77A to 77D and vehicle A in response to the receipt timing at which the electric wave has been received by the GPS receiver 44 so as to detect the absolute current position of the vehicle and a degradation coefficient determining circuit 46 for determining the degradation coefficient of the electric wave. The degradation coefficient determining circuit 46 is a circuit for transmitting a measurement error increase signal if the degradation coefficient, which is included in the electric wave received by the GPS receiver 44, exceeds a predetermined value or if the intensity of the electric wave is lower than a predetermined level (for example, a case in which the electric wave cannot be received while the vehicle is running, for example, in a tunnel).

The vehicle position recognition device 4 further comprises a switch portion 20 for selectively switching the vehicle position recognition portion 4A acting by utilizing the earth magnetism and the vehicle position recognition portion 4B acting by utilizing the satellite. The switch circuit 20 selects the second vehicle-position recognition portion 4B which is arranged to act by utilizing the satellite when no measurement error increase signal is transmitted from the degradation coefficient determining circuit 46. If the measurement error increase signal is transmitted, the switch circuit 20 selects the first vehicle-position recognition portion 4A which is arranged to act by utilizing the earth magnetism. The thus selected signal denoting the current vehicle-position is transmitted to the CPU 11 of the above-described navigation control unit 10.

Control Procedure

Then, a scroll control operation performed by the CPU 11 and according to this embodiment will be described with reference to FIG. 11.

Figure 11A:
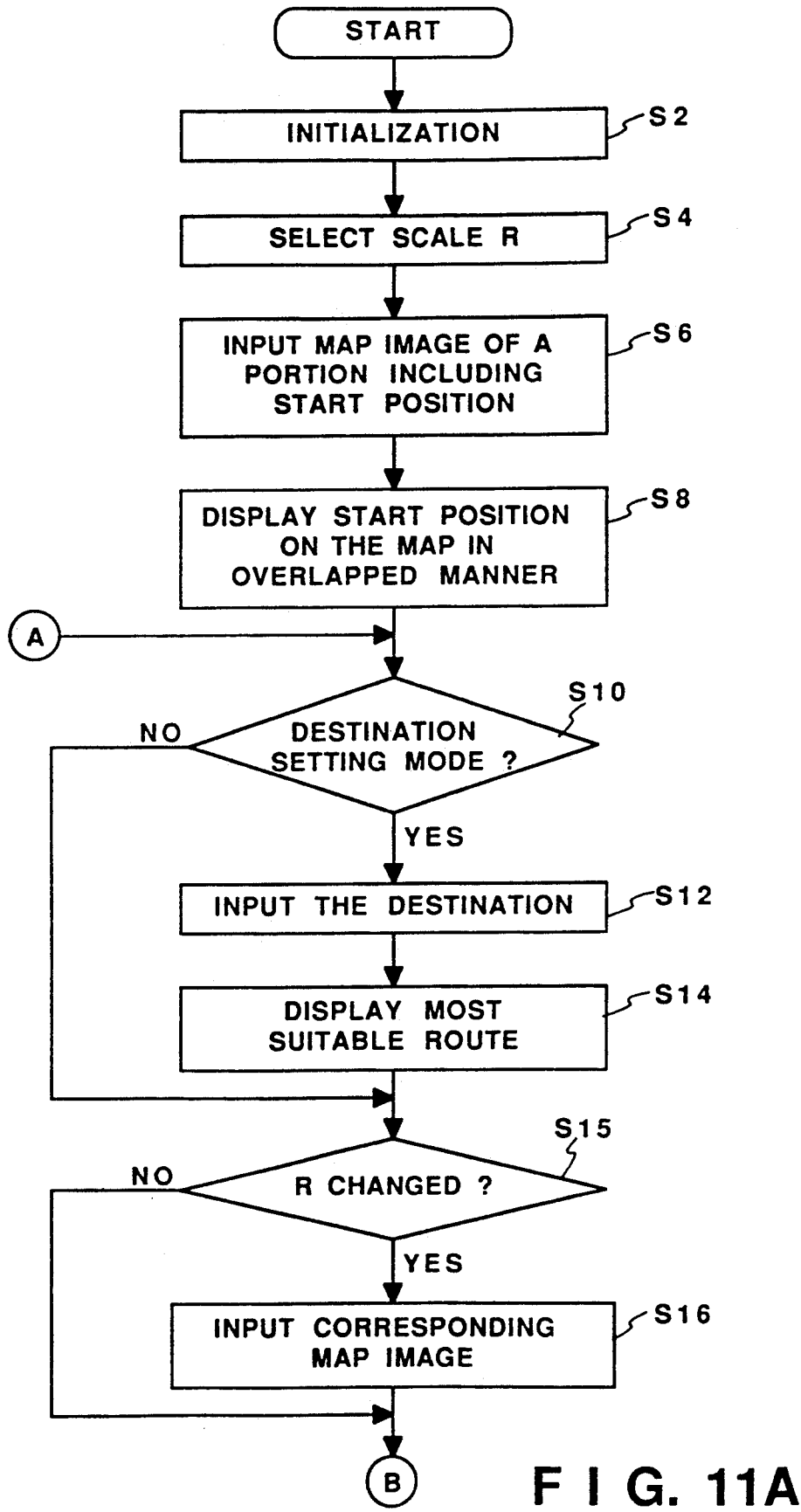
FIGS. 11a and 11b show flow charts which illustrate the scroll control according to the first embodiment.
Figure 11B:
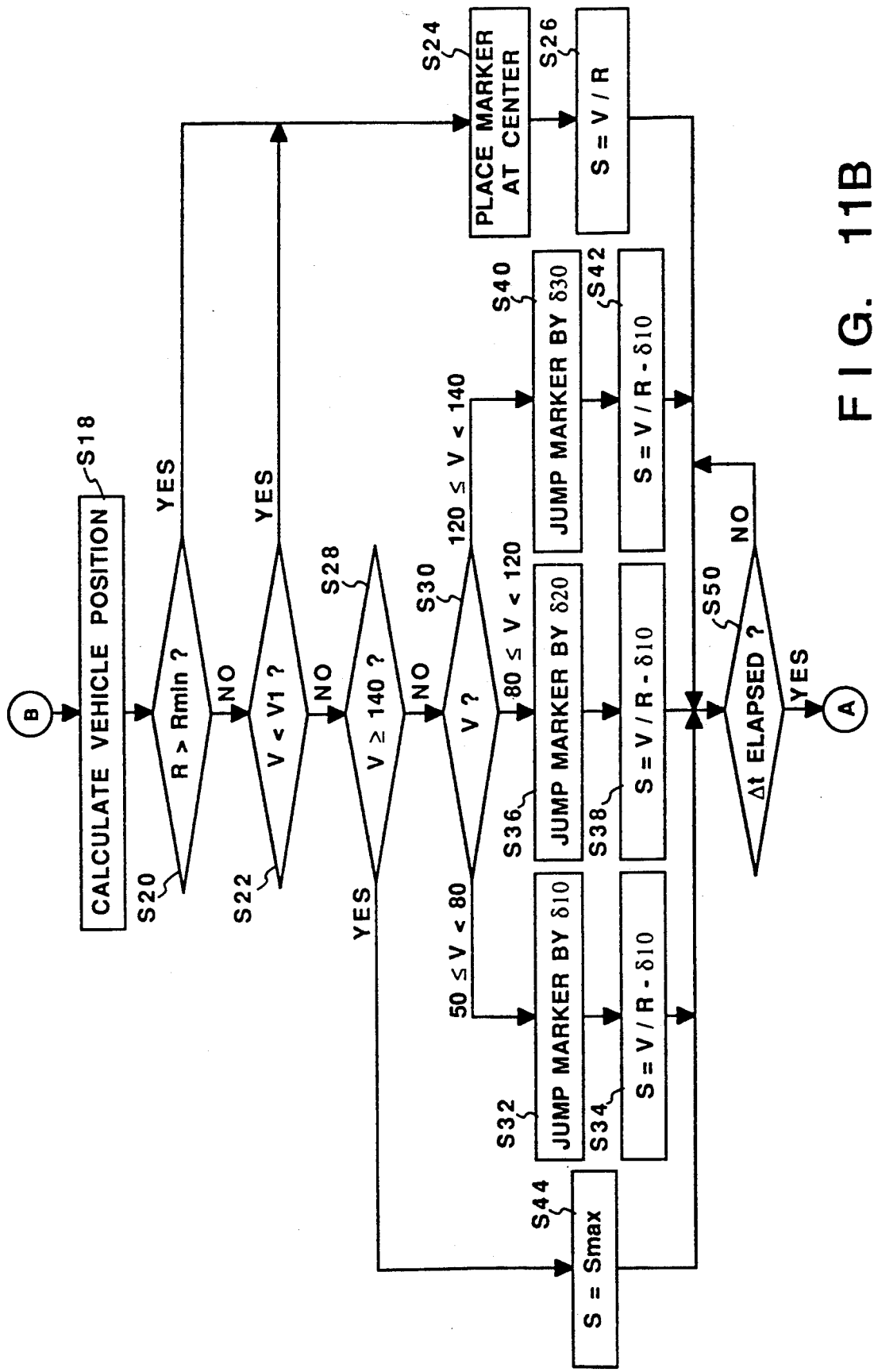

The program shown in FIG. 11 commences in response to the operation of a navigation start switch (omitted from illustration).

In step S2, the initialization of the system is performed. At this time, the current vehicle position P can be recognized from only the recognition portion 4B which utilizes the GPS. In step S4, map reduction ratio R selected by a driver is inputted. In step S6, an image of the reduction ratio R of the map image including the start position which has been recognized in step S2 is read out from the CD-ROM 1. In step S8, the map image and the vehicle position P are displayed on the display of the display device 6 in an overlapped manner. In this case, the map image to be displayed is an image of the size of a x b extracted form a map read out from the CD-ROM with the vehicle position P centered.

In step S10, it is determined whether or not the driver has set the display mode in which the destination is displayed together with the current position. If the above-described mode has been set, the flow advances to step S12 in which the destination instructed by the driver is inputted. The flow advances to step S14 in which the most suitable route from the current position to the destination is displayed.

The flow advances to step S15 and ensuing steps. The process of steps S15 to S44 is performed at time interval of Δt.

In step S15, it is checked whether or not the driver has changed the reduction ratio R of the map. In step S16, an image corresponding to the reduction ratio R which has been changed is read out. In step S18, the current vehicle position is calculated in the manner as described with reference to FIGS. 9 and 10. The vehicle position thus obtained is converted into position P expressed in XY-coordinate system about the map read in step S16.

In steps S20 and S22, it is determined whether or not the current reduction ratio R and vehicle speed V respectively meet the following relationships:

$R > Rmin$ $V < V1 \ (= 50 \ km/h)$

The fact that either of the above-described relationships is met means that the vehicle running state corresponds to the state described with reference to FIGS. 1 to 3. Therefore, the flow advances to step S24 in which a vehicle marker is displayed at central C of the display frame. In step S26, the background map is scrolled at the speed S determined in accordance with Equation (3). In step S50, the time lapse Δt is confirmed and the flow returns to step S10. More specifically, if either of the relationships $R > Rmin$ or $V < V1$ is met, the background image is scrolled at speed S while the vehicle position P is displayed at the center C of the display frame.

A description will now be made about a case in which it has been determined in steps S20 and S22 that both $R \leq Rmin$ and $V \geq V1$ are met. In this case, the control process is, as shown in steps S28 and S30, branched to any of steps S32, S36, S40 and S44 in accordance with the vehicle speed V. That is, the user's vehicle displayed position P is displayed in a jumped manner by the jump quantity δ which is determined in accordance with the vehicle speed (in steps S32, S36 and S40). The background map is, in steps S34, S38 and S42, scrolled at the following scroll speed determined in accordance with Equations (12) to (14):

$$\vec{S} = \frac{\vec{V}}{R} - \vec{\delta}$$

If it has been determined, in step S28, that the relationship $V \geq 140 \ km/h$ is held, the vehicle display position P is not included in the frame. Therefore, the flow advances to step S44 in which only the background image is scrolled at speed Smax.

It is preferable that, in the case where the mode in which the most suitable route to the destination has been set in Step S10, the remaining distance to the destination be displayed in a bar graph display manner (omitted from illustration) in addition to the display of the above-described mode.

Advantages of the First Embodiment

As described above, according to the first embodiment, the following advantages can be obtained:

(1)-1: Even if the reduction ratio R of the selected map is large, that is, even if a map which has been considerably reduced is displayed in the frame, the deterioration in the visibility can be prevented and the vehicle position P can be disposed in the displayed frame. Therefore, the vehicle position P can always be displayed at the central position of the frame and the background map is scrolled.

(1)-2: Even if the reduction ratio R of the selected map is low, as long as the vehicle speed $\vec{V}$ is low, the vehicle position P can always be displayed at the central position of the frame and the background map is scrolled similarly to (1)-1.

(2): Since the position of the vehicle position display marker is jumped by a predetermined distance δ0 in the opposite direction to the scrolling direction of the frame even if the vehicle speed has been raised, the deterioration in the visibility of the background map can be prevented. Furthermore, the problem that the vehicle display position may run out of the frame due to the fact that the scrolling of the background map cannot follow the vehicle speed can be prevented.

(3): Furthermore, the determination, whether or not the jump display control of the vehicle position marker is performed, is made in consideration of both the vehicle speed V and the map reduction ratio R. Therefore, unnecessary jump control operation is prevented so that excellent visibility can be obtained.

(4): Since the jump quantity δ is, in accordance with the vehicle speed, set to a suitable value, the jump quantity is reduced to the minimum level while preventing the runout of the vehicle display position from the frame. Therefore, excellent visibility can be maintained.

(5) As described with reference to FIG. 5, the jump quantity δ1 is arranged to be continuously changed in accordance with the vehicle speed as an alternative to the structure in which the same is arranged to be a constant quantity. Although the burden on the CPU for the image processing would be increased, the vehicle position display position can be smoothly changed. Therefore, excellent visibility can be obtained even if the above-described modified manner is employed.

Second Embodiment

The above-described first embodiment is arranged to control the display when the processing speed (which considerably depends upon the processing speed of the employed CPU) of the navigation apparatus cannot correspond to the vehicle speed. The navigation apparatus according to a second embodiment of the present invention is arranged to comprise a CPU the processing speed of which is sufficient to make the display frame scroll even when the vehicle is running at high speed. However, although the scroll speed can be raised significantly, the above-described problem in terms of the visibility must be overcome.

According to the second embodiment, two scroll speed values Smax and S'max are induced. The scroll speed Smax is arranged to be similar to that according to the first embodiment. Therefore, it is the maximum scroll speed at which the visibility of the driver can be maintained. On the other hand, the scroll speed S'max is the maximum scroll speed for the CPU of the navigation apparatus without affecting the other processing which must be processed by that CPU. Therefore, the following relationship must, of course, be held:

$$S'max > Smax \quad (17)$$

As described above, if scrolling is performed at the speed S'max, the visibility is deteriorated. According to the second embodiment, the following four scrolling control methods are prepared in accordance with the vehicle speed V and the reduction ratio of map R:

(1): In the case where R>Rmin, the vehicle marker is, similar to the first embodiment, displayed at the central position of the display frame and the background map image is scrolled at the following scroll speed:

$$\vec{S} = \frac{\vec{V}}{R} \quad (18)$$

(2): When the vehicle is running at a speed at which the scroll speed does not exceed the above-described speed Smax (S<Smax), a control similar to the above-described description (1) is performed. That is, the marker is displayed at the central position of the display frame. Since the marker can be fixed at the central position and the scroll speed of the background map image can be restricted to be lower than Smax, visibility can be maintained.

(3): In the case where the vehicle is running at a speed at which the scroll speed exceeds the above-described speed Smax (S≧Smax), the control method is changed as follows:

(3)-1

When the vehicle marker P does not enter the end region (the hatching section of FIG. 12) of the display frame, the scroll speed of the background image is set to the maximum speed Smax which is the maximum speed for the visibility to be maintained. The vehicle marker P is displaced at a position displaced from the center of the display frame by the following quantity expressed by vector $\vec{\delta}$:

$$\vec{\delta} = \frac{\vec{V}}{R} - S\vec{max} \quad (19)$$

Even if the scroll speed is fixed to Smax, the inconformity of the map and the displayed vehicle position can be prevented if the marker P is displaced at the position obtained from Equation (19). Furthermore, visibility is also maintained.

Figure 12:
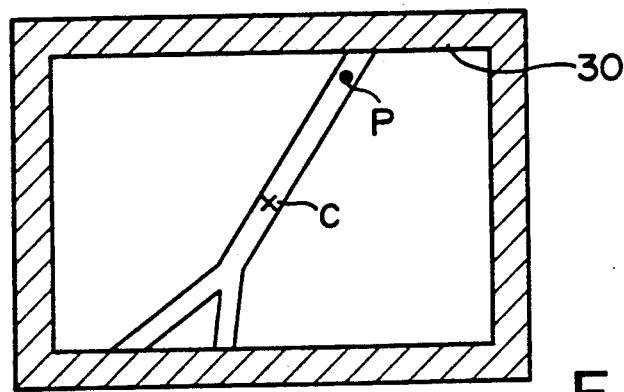
FIG. 12 illustrates the end portion of the display frame according to the second embodiment of the present invention.

According to this control, the vehicle position marker P moves back and forth and right and left between the center C of the display frame and the inner end 30 of the hatched section of FIG. 12 in accordance with the vehicle speed.

Figure 14:
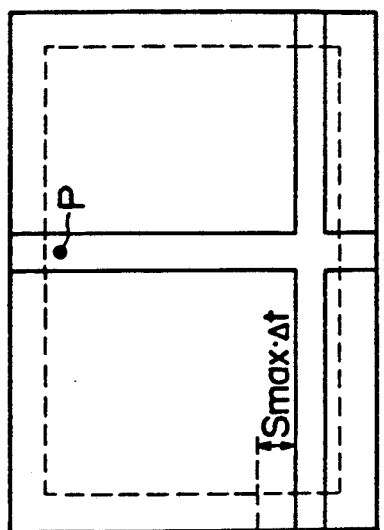
FIG. 14 illustrates the change in the display by the display control, according to the second embodiment, performed when the vehicle marker P has approached the above-described end portion.
Figure 14:
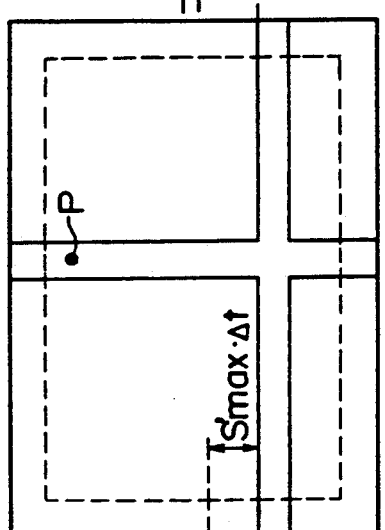
Figure 14:
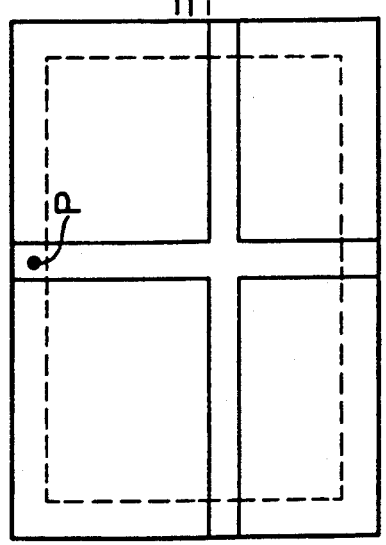

(3)-2:

During the execution of the control according to (3)-1, the vehicle marker can be further raised. In this case, the marker P tends to enter the hatched section of FIG. 12 (see FIG. 14(a)). In this case, there arise a fear in that the marker P would run out of the display frame. Therefore, the control is performed while setting the scroll speed S of the background image to the limit speed S'max of the apparatus, causing the result as shown in FIG. 14(b). As a result, the vehicle marker P runs out of the above-described hatched section. The scrolling is performed at the maximum speed Smax which is the highest speed at which visibility is maintained. If the vehicle speed is maintained at relatively high speed, the scroll control is performed from the state as shown in FIG. 14(a) to 14(c).

Figure 15B:
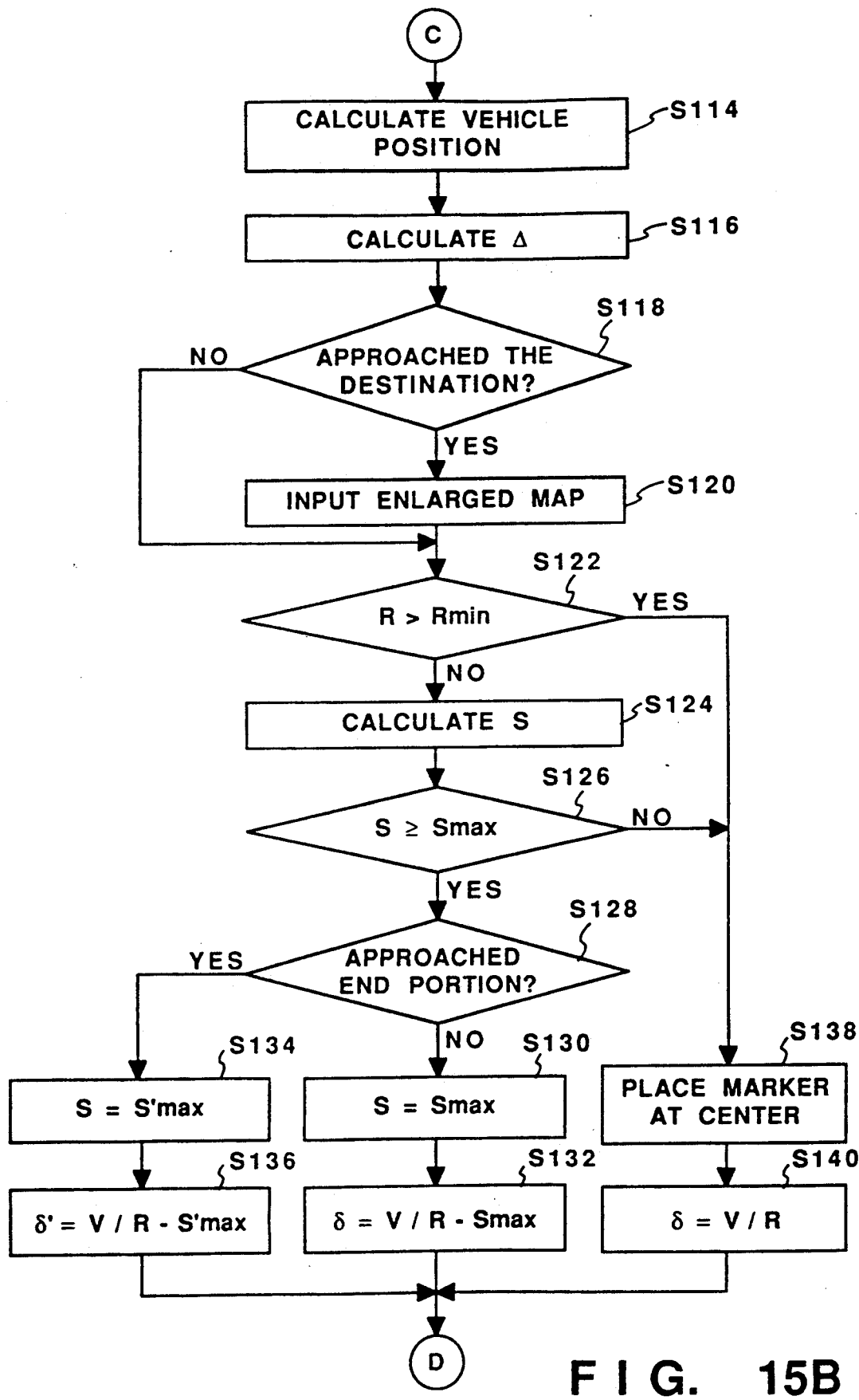

FIG. 15 is a flow chart which illustrates the control procedure according to the second embodiment. Since steps S100 to S112 are the same as steps S2 to S14 according to the first embodiment, their descriptions are omitted here. The description will now be made from step S114.

In step S114, the current vehicle position is calculated. In step S116, the residual distance Δ1 from the thus obtained current position to a destination is calculated. In step S118, it is determined whether or not the vehicle has approached the destination on the basis of the residual distance Δ1. If it has been determined that the vehicle has approached the destination, an enlarged map (the reduction ratio R is small) becomes necessary. Therefore, an enlarged map is read from the CD-ROM in step S120 so as to replace the map image which has been used.

In step S122, it is determined whether or not the current reduction ratio R is larger than Rmin also employed in the first embodiment, that is, it is determined whether or not the enlarged map is used. If it has been determined that R>Rmin, a map which is not enlarge has been used and the quantity of the scroll is therefore small. As a result, the flow advances to steps S138 and S140 in which the vehicle marker P is displaced at the central position of the display frame and the background map is scrolled at the speed calculated in accordance with Equation (18) similarly to the first embodiment (steps S24 and 26).

The description will be made on a case where $R \leq Rmin$, that is, a case in which an enlarged map has been used. The flow advances to step S124 in which the scroll speed $\vec{S}(=\vec{V}/R)$ when the marker is fixed to the central position of the display frame is calculated. In step S126, the thus calculated value is subjected to a comparison with the scroll speed Smax, which is the maximum speed at which visibility can be maintained. If the result of the calculation is $S<Smax$, inconformity with the map can be prevented and visibility is maintained. Therefore, the flow advances to step S138 and the ensuing steps.

Figure 13:
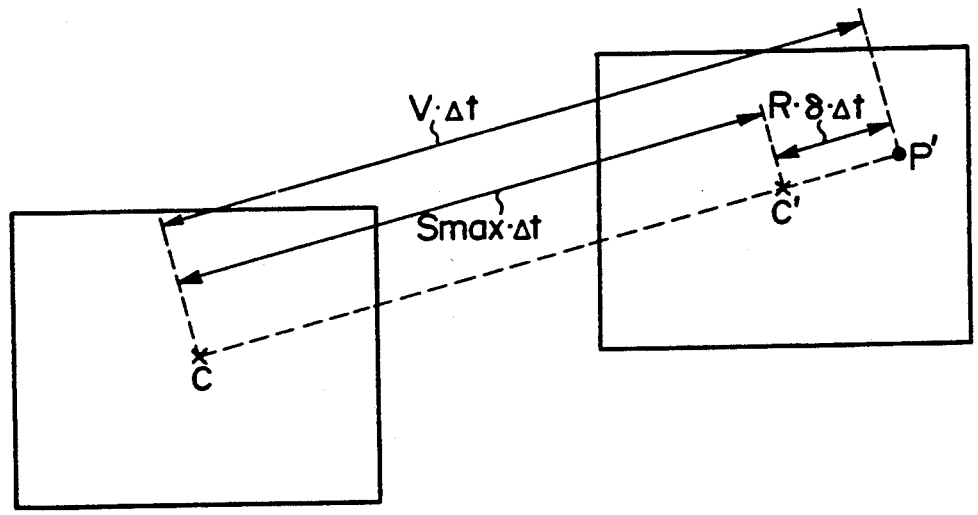
FIG. 13 illustrates the method of calculating the scroll speed (jump speed) of the vehicle marker P according to the second embodiment.

In the case where $R \leq Rmin$ and simultaneously $S \geq Smax$, the flow advance to step S128 in which it is determined whether or not the vehicle marker P has entered the end portion (the hatched section) of FIG. 12. If the vehicle marker has not entered the above-described region, the flow advances to step S130 in which the scroll speed S is set to the maximum speed Smax which is the maximum speed at which visibility can be maintained. In order to make the map and the vehicle position coincide with each other, the flow advances to step S132 in which the marker position P is scrolled at the scroll speed $\delta$ obtained in accordance with Equation (19). It is apparent in FIG. 13 since the following relationship is held:

$$R \cdot Smax \cdot \Delta t + R \cdot \delta \cdot \Delta t = V \cdot \Delta t \tag{20}$$

In the case where an enlarged map is displayed and simultaneously the vehicle speed V is high, the background is scrolled while maintaining the visibility if the vehicle marker P does not enter the end portion of the display frame.

On the other hand, if the marker P has entered the end portion of the display frame, the flow advances to step S134 in which the speed at which the background image is scrolled is set to the limit speed S'max before the flow advances to step S136. In step S136, the scroll speed $\delta'$ of the marker P is set to the value obtainable from the following equation:

$$\vec{\delta'} = \frac{\vec{V}}{R} - \vec{S'max} \tag{21}$$

As a result, the marker can be quickly removed from the end portion of the display frame as much as possible.

Modification

A variety of modifications may be employed within the scope of the thesis of this invention.

The modification shown in FIG. 5 is one example of the present invention.

According to the above-described first and second embodiments, the vehicle position is, in principle, displayed in the central position of the frame while the background image is scrolled. However, the present invention is not limited to the above-described methods of displaying the vehicle position That is, a method can be employed in which the vehicle position is displayed while moving on the map image with the background image not being scrolled. That is, if the vehicle display scroll speed cannot correspond to the velocity of the vehicle speed, the background image is scrolled in the opposite direction to the forward direction.

Although the vehicle position is normally displayed in the central position of the frame according to the first and second embodiments, the present invention is not limited to the above-described position.

The present invention is not limited to the above embodiments and various changes and modifications can be made within the spirit and scope of the present invention. Therefore, to appraise the public of the scope of the present invention the following claims are made.

What is claimed is:

1. A drive navigation apparatus for detecting the current vehicle position, overlapping a marker image P denoting the vehicle position thus detected on a background map image and displaying them on a display frame having a predetermined display size therein so that a driver is guided at the time of the operation of the vehicle, said apparatus comprising:

display means having said display frame;

speed detection means for detecting the vehicle speed V of the vehicle; and display control means for (i) fixedly displaying either said marker image P or said background map image when the vehicle speed V is lower than predetermined vehicle speed V1 while displaying the other image in a scrolled manner which corresponds to the movement of the vehicle and (ii) displaying both said marker image P and said background map image in such a manner that they are moved in opposite directions to each other in accordance with the movement of the vehicle when the vehicle speed V thus detected is faster than said predetermined vehicle speed V1.

2. An apparatus according to claim 1, wherein said navigation apparatus stores map images of different reduction ratios; and said display control means further comprises means for determining the larger ratio by subjecting reduction ratio R of the map image to be displayed on said display means and predetermined reduction ratio Rmin to a comparison, so as to relatively scroll-control said vehicle marker P and said background map in accordance with the vehicle speed in only case where said reduction ratio R of said map image to be displayed is smaller than said predetermined reduction ratio Rmin.

3. An apparatus according to claim 2, wherein, in the case where the display method of said navigation apparatus is a type in which said vehicle marker P is displayed at a predetermined position of a frame of said display device, said background image is scrolled at speed V/R when $V<V1$ while said background image is scrolled at its maximum scroll speed Smax and said vehicle marker is moved at speed $\delta=V/R-Smax$ in a direction opposite to the direction of the scroll of said background image when $V \geq V1$.

4. An apparatus according to claim 2, wherein, in the case where the display method of said navigation apparatus is a type in which said vehicle marker P is displayed at a predetermined position of a frame of said display device, said background image is scrolled at speed V/R when $V<V1$, while said vehicle marker is jumped at a predetermined jump speed $\delta 0$ in the direction in which said vehicle moves and said background image is scrolled at speed $S=V/R-\delta 0$ in a direction opposite to the direction in which said vehicle moves in the case where $V \geq V1$.

5. An apparatus according to claim 4, wherein a plurality of values are provided as said predetermined jump speed $\delta 0$.

6. An apparatus according to claim 4, wherein the value of said jump speed $\delta 0$ is restricted to a range in which said vehicle marker does not run out of said display frame of said display device due to said jump at said speed δ0.

7. An apparatus according to claim 1, wherein said map image is stored in a CD-ROM.

8. An apparatus according to claim 2, wherein said vehicle speed V1 is previously determined in accordance with the processing speed of a computer employed in said navigation apparatus and said reduction ratio Rmin.

9. An apparatus according to claim 2, wherein, in the case where the reduction ratio of said map image is small or in the case where the vehicle speed is high, said scroll speed of said map image is set to the maximum value.

10. An apparatus according to claim 1, wherein, when said vehicle marker has approached the end portion of said display frame of said display means, said scroll speed of said map image is set to the maximum value.

11. An apparatus according to claim 2 further comprising input means for inputting information about the destination and means for detecting a fact that the vehicle has approached the destination, wherein said map image is replaced by an image of a small reduction ratio when the vehicle has approached the destination.

* * * * *

UNITED STATES PATENT AND TRADEMARK OFFICE
CERTIFICATE OF CORRECTION

PATENT NO. : 5,093,669

DATED : March 3, 1992

INVENTOR(S) : Hiroshi Kajiyama

It is certified that error appears in the above-identified patent and that said Letters Patent is hereby corrected as shown below:

column 5, line 31:
"(21)." should be --(2).-- column 6, line 6:
"speed S" should be --speed $\vec{S}$--;

column 7, line 4:
after "$\delta 1$" insert --denotes the--;

column 7, line 9:
"$\vec{C}$ =" should be --$\vec{C}'$ = -- column 7, line 59:
"and and" should be --and--;

column 8, line 4:
"$\vec{P}'$" should be --P'--;

column 8, line 6:
"P'" should be --$\vec{P}'$--;

UNITED STATES PATENT AND TRADEMARK OFFICE
CERTIFICATE OF CORRECTION

PATENT NO. : 5,093,669
DATED : March 3, 1992
INVENTOR(S) : Hiroshi Kajiyama

It is certified that error appears in the above-identified patent and that said Letters Patent is hereby corrected as shown below:

column 8, line 8:

"S" should be --$\vec{S}$--;

column 8, line 68:

change "x" each occurrence to --y-- and "$\frac{a}{2}$" to --$\frac{b}{2}$--.

column 9, line 61:
after "vehicles" insert --.--;

column 11, line 63:
"/h" should be --/h)--;

column 15, line 24:

"$\delta$" should be --$\vec{\delta}$--;

column 15, line 58:
after "position" insert --.--.

Signed and Sealed this

Eleventh Day of January, 1994

Attest:

BRUCE LEHMAN

Attesting Officer    Commissioner of Patents and Trademarks